United States Patent [19]

Prelaz et al.

[11] Patent Number: 4,607,143
[45] Date of Patent: Aug. 19, 1986

[54] APPARATUS FOR EFFECTING A REDIALLING INTERRUPTION OF ANY OPTIONAL DURATION

[75] Inventors: Jean-Claude Prelaz, Paris; Paul Queudot, Suresnes, both of France

[73] Assignee: U.S. Philips Corporation, New York, N.Y.

[21] Appl. No.: 559,514

[22] Filed: Dec. 8, 1983

[30] Foreign Application Priority Data

Dec. 8, 1982 [FR] France ............................. 82 20553

[51] Int. Cl.$^4$ ............................................ H04M 1/27
[52] U.S. Cl. ............................ 179/90 BD; 179/18 BA; 340/359
[58] Field of Search .............. 179/18 B, 18 BA, 90 B, 179/90 BD, 5 R, 5 P; 340/359, 361

[56] References Cited

U.S. PATENT DOCUMENTS

| 4,145,581 | 3/1979 | Stockdale | 179/90 BB |
| 4,332,985 | 6/1982 | Samuel | 179/90 BD |
| 4,342,882 | 8/1982 | Gravenhorst et al. | 179/90 B |
| 4,405,833 | 9/1983 | Cave et al. | 179/5 R |
| 4,417,100 | 11/1983 | Carlson et al. | 179/5 R |
| 4,520,503 | 5/1985 | Kirst et al. | 381/56 |

Primary Examiner—Thomas W. Brown
Attorney, Agent, or Firm—Thomas A. Briody; William J. Streeter; Leroy Eason

[57] ABSTRACT

Apparatus for effecting a redially interruption of any optional duration starting from a redialling circuit having an input terminal and an output terminal, the output terminal supplying an interrupt voltage which efficiently interrupts the redialling operation, the current-voltage characteristic of the input terminal being such that current increases continously for voltage values between zero and a predetermined threshold value, and is almost zero for voltages higher than said threshold voltage, a diode connected from the output terminal to the input terminal, and the input terminal is connected to a voltage source for maintaining the voltage at the input terminal at a value higher than the threshold voltage when after the finite duration of the interruption has elapsed the output terminal no longer supplies the interrupt voltage.

6 Claims, 5 Drawing Figures

APPARATUS FOR EFFECTING A REDIALLING INTERRUPTION OF ANY OPTIONAL DURATION

BACKGROUND OF THE INVENTION

1. Field of the Invention

The present invention relates to apparatus for effecting an interruption of any optional duration in the redialling operation of a redialling circuit having an interrupt loop which interrupts dialling for a finite duration, the circuit having more specifically a first supply terminal connected to a first potential of a value higher than a predetermined threshold value, a second supply terminal connected to a second potential which is negative relative to the first potential, an output terminal supplying during the said finite duration of the interruption and when an interrupt command is transmitted by a memory of the circuit an interrupt voltage which is also higher than the threshold value and an input terminal which efficiently interrupts the redialling operation when the said interrupt voltage is applied thereto, the current-voltage characteristic of the said input terminal being such that the current increases continuously for voltage values between zero and the said predetermined threshold value, and is almost zero for voltages higher than this threshold value.

The invention can be used very advantageously in the field of telephony.

Hereinafter, the expression "of any optional length" is to be understood to mean a duration of a great length relative to the said finite duration of the redialling interruption, which is intrinsic to the said dialling circuit comprising the redialling interrupt loop. An interruption of, for example, a duration of the order of 10 times the duration of the finite interruption of the dialling circuit will be considered to be such an interruption of any optional length.

2. Description of the Prior Art

The dialling circuits having a redialling interrupt loop, the interruption being of a finite duration, such as the circuits marketed by "R.T.C.-La Radiotechnique Compelec" under the name PCD 3323, offers the user the possibility to redial automatically a subscriber number already dialled and stored in a memory. For the case in which the subscriber number requires at a given instant a tone signal, for example after the district exchange code or a call abroad, these circuits are provided with an automatic redialling interruption of a finite duration which may be of the order of some seconds. When the delay corresponding to this finite duration has elapsed, the redialling operation is continued until the number to be called is carried through. In the example of the above-mentioned circuit PCD 3323 an interrupt signal appears, when an interrupt command is transmitted by a memory of the circuit at an output terminal, during the finite duration of the interruption, in the form of a d.c. voltage. An input terminal of the circuit is capable of receiving the interrupt signal in order to effectuate the redialling interruption. To realize this redialling interruption in practice, it is sufficient to interconnect the input terminal and the output terminal.

It may happen, in order to prevent, for example the redialling operation from starting again before the tone signal has been obtained, that one wants to have the possibility to give the command to achieve redialling manually by realising a semi-automatic redialling arrangement. For that purpose, it is necessary that on the one hand the interruption can be maintained for a duration of any optional length, and that on the other hand the interruption can be stopped thereafter in order to restart the redialling operation. The present invention has for its object to realize these two functions while making advantageous use of the current-voltage characteristic specific to the input terminal of the circuit PCD 3323.

SUMMARY OF THE INVENTION

According to the present invention, a redialling interruption of any optional length is provided in the operation of a redialling circuit comprising a dialling interrupt loop which interrupts redialling for a finite duration such redialling for circuit having a first supply terminal connected to a first potential of a value higher than a predetermined threshold voltage, a second supply terminal connected to a second potential which is negative relative to the first potential, an output terminal supplying during the said finite duration of the interruption and when an interrupt command is transmitted by a memory of the circuit an interrupt voltage which is also higher than the threshold voltage, and an input terminal which efficiently interrupts the redialling operation when the said interrupt voltage is applied to it, the current-voltage characteristic of the said input terminal being such that the current increases continuously to a level corresponding to the threshold voltage as the voltage thereat increases from zero up to the threshold voltage and then drops almost to zero for voltages higher than the threshold voltage. The circuit is characterized in that a uni-directional conducting element whose conducting sense is directed from the output terminal to the input terminal is arranged between the said output terminal and the said input terminal, and that the input terminal is connected to means for maintaining the voltage at the input terminal at a value higher than the threshold voltage when, after the said finite interruption has elapsed, the output terminal does no longer supply the said interruption voltage.

Hereinafter a more detailed description of the invention will be given which renders it possible to effect an interruption of any optional length starting from the finite duration produced by the circuit. Because of the availability of an interruption of any optional length the use of the method according to the invention for realizing a semi-automatic redialling arrangement can be contemplated. An application of the method according to the invention to a semi-automatic redialling arrangement with a controlled length of the interruption, is mainly characterized in that interruptor means are arranged between the input terminal and the second supply terminal, these interruptor means being in the open state during the whole duration desired for the redialling interruption and are manually adjusted to the closed state when a continuation of the redialling operation is desired.

The following description, given by way of example with reference to the accompanying drawings, will make it better understood what the invention is and how it can be put into effect.

DESCRIPTION OF THE PREFERRED EMBODIMENT

Figure 1:
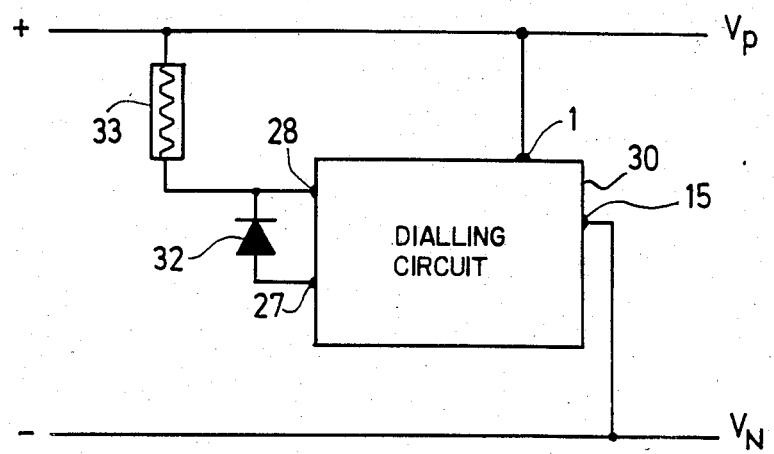
FIG. 1 shows the circuit diagram of a first mode of operation of the method according to the invention.
Figure 2:
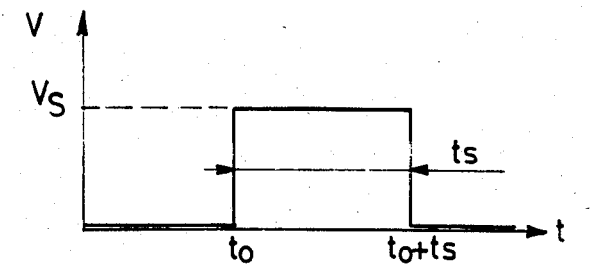
FIG. 2 shows the shape of the signal at the output terminal of the dialling circuit with a redialling interruption loop, which interruption is of a finite length.
Figure 3:
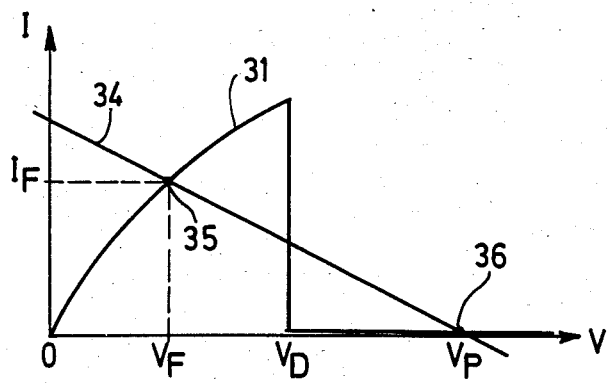
FIG. 3 shows the current-voltage characteristic of the input terminal of the said dialling circuit and also the load line corresponding to the circuit diagram of FIG. 1.

FIG. 1 shows the circuit diagram of a dialling circuit 30 having a redialling interrupt loop, the interruptions having a finite duration $t_s$. This circuit 30, for example the circuit PCD 3323 marketed by "La Radiotechnique-Compelec", has more in particular a first supply terminal 1 connected to a first potential $V_P$ having a value higher than a predetermined threshold value $V_D$, a second supply terminal 15 connected to a second potential $V_N$ which is negative relative to the first potential $V_P$. As is also shown in FIG. 2, an output terminal 27 of the circuit 30 supplies during the said finite duration $t_s$ of the interruption and when an interrupt command is transmitted by a memory of the circuit 30 an interrupt voltage $V_S$ which also exceeds the threshold value $V_D$. An input terminal 28 adequately interrupts the redialling operation when the said interrupt voltage $V_S$ is applied to circuit 30. FIG. 3 shows the current-voltage characteristic 31 of the input terminal 28. As is shown in FIG. 3, the current I increases continuously for values of the voltage V between zero and the threshold value $V_D$, and is almost zero for voltages higher than this threshold voltage. The voltage $V_D$ plays the part of a logic threshold for the input terminal 28: if the voltage applied to it is less than $V_D$ no interrupt signal is transmitted by this terminal, and when the voltage applied is higher than $V_D$ the input terminal 28 conveys an interrupt signal to the circuit 30. In a simple lay-out of the connections, the input terminal 28 is directly connected to the output terminal 27 so that, when at an instant $t_s$ the memory of the circuit 30 transmits an interrupt command the voltage at the output terminal 27, and consequently at the input terminal 28, changes from zero to $V_S$. And since $V_S$ is higher than $V_D$, the interrupt command interrupts redialling operation of the circuit 30 during the whole finite duration $t_s$. If one wants to obtain an interrupt signal of any optional length at the input terminal 28 from the interrupt voltage $V_S$ of the finite duration $t_s$, it is advantageous, as is shown in FIG. 1, to arrange a unidirectional conducting element 32, whose conducting sense is directed from the output terminal to the input terminal, between the said output terminal 27 and the said input terminal 28. In the circuit diagrams shown in FIGS. 1, 4 and 5 this unidirectional conducting element 32 is a diode. In addition, it is necessary to connect the input terminal 28 to means for maintaining the voltage V at the input terminal at a value higher than the said threshold value $V_D$ when, after the finite duration $t_s$ of the interruption has elapsed, the output terminal 27 no longer supplies the interruption voltage $V_S$.

In the first embodiment of the invention shown in FIG. 1 the said means for maintaining the voltage V at the input terminal 28 at a value higher than the threshold voltage $V_D$ are formed by a resistor 33 arranged between the said input terminal 28 and the first supply terminal 1. Thus, the resistor 33 determines, in the current-voltage diagram of FIG. 3, a load line 34 which, when the resistor 33 is of an adequately high value, limits the current to a level below that corresponding to the threshold voltage $V_D$ and thereby defines, by intersecting the characteristic 31 to stable operating points 35, 36 at the input terminal 28. When voltage is applied to the circuit, and as long as the voltage at the output terminal 27 is zero, the stable operating point of the input terminal 28 is the point 35, that is to say that the potential at the input terminal is $V_F$ and that the current through the resistor 33 is $I_F$. Since $V_F$ is less than $V_D$, the input terminal 28 does not convey any redialling interrupt signal to the circuit 30. When at the instant $t_o$ the voltage supplied by the output terminal 27 changes from 0 to $V_S$, which is higher than $V_D$, the stable operating point of the input terminal 28 is the point 36: the current across the resistor is substantially zero and the potential at the input terminal is the supply potential $V_P$. Since $V_P$ is higher than $V_D$, the input terminal 28 conveys a redialling interrupt signal to the circuit 30. When at the instant $t_o+t_s$ the voltage supplied by the output terminal 27 changes to zero again, the input terminal 28 is maintained at the operating point 36, that is to say it continues, during in principle an unlimited length of time, to supply a redialling interrupt signal to the circuit 30. Typical operating values of circuit PCD 3323 are $V_P=3$ V, $V_N=0$, $V_D=1.3$ V, resistor $33=2.2M\Omega$.

Figure 4:
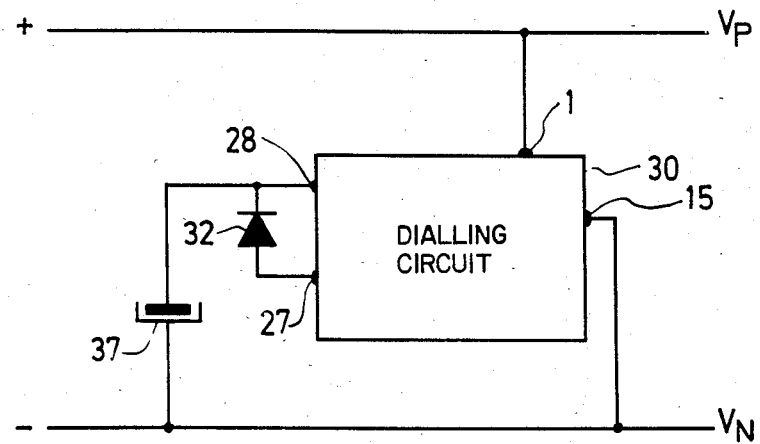
FIG. 4 shows the circuit diagram of a second embodiment of the method according to the invention.

FIG. 4 shows a second embodiment of the invention in which the means to maintain the voltage V at the input terminal 28 at a value higher than the threshold voltage $V_D$ are formed by a capacitor 37 arranged between the said input terminal 28 and the said second supply terminal 15. Thus, when the circuit is made operative and as long as the voltage at the output terminal 27 is zero, the voltage at the input terminal 28 is also zero and the said input terminal does not supply any redialling interrupt signal. When at the instant $t_o$ the voltage supplied by the output terminal 27 takes the value $V_S$, the voltage at the input terminal 28 assumes the value $V_S-V_d$, which is the value $V_S$ less the d.c. voltage drop $V_d$ of the diode 32. If $V_S-V_d$ is higher than $V_D$, the input terminal 28 then applies a redialling interrupt signal to the circuit 30 and also the capacitor 27 is charged by this voltage $V_S-V_d$. At the instant $t_o+t_s$ when the voltage $V_S$ at the output terminal 27 is cancelled, the potential at the input terminal 28 is maintained at the value $V_S-V_d$ by the capacitor 37 during a period of time which is unlimited in principle. In practice, because of inevitable current losses, the capacitor 37 discharges slowly across the circuit or across itself, so that at a certain moment the voltage at the input terminal 28 becomes less than $V_D$ and the interruption of the automatic redialling operation is discontinued. However, we have shown experimentally that using a circuit PCD 3323, a voltage $V_S$ of approximately 3 V and a threshold voltage $V_D$ of 1.3 V it is possible to obtain a redialling interruption of 30 seconds at 25° C., using a 3.3F capacitor which represents a long duration compared to the 3 seconds duration $t_s$ of the automatic interruption produced by the circuit.

Figure 5:
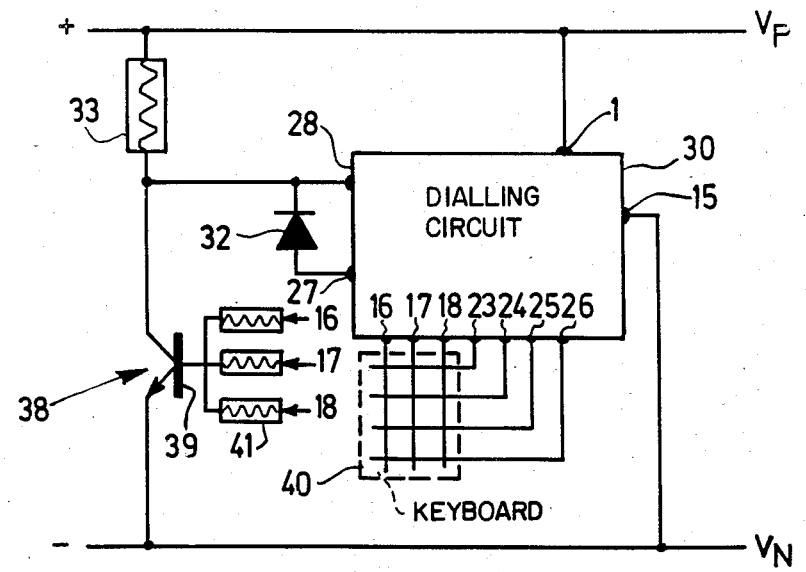
FIG. 5 shows the circuit diagram of the use of the invention in a semi-automatic redialling arrangement with a controlled length of the interruptions.

When one has means at one's disposal to obtain a duration of any optional length, or a very long duration, of the redialling interruption, it is possible to apply the invention to the realization of a semi-automatic redialling arrangement with controlled duration. To that end, as shown in FIG. 5, interruptor means 38 are arranged between the input terminal 28 and the second supply terminal 15, these interruptor means being in the open state during the whole duration desired for the redialling interruption, and are adjusted manually to the closed state when one wants to continue the redialling operation. In the embodiment of FIG. 5 the said interruptor means 38 are formed by a transistor 39 whose base is connected, by three resistors to three columns 16, 17, 18 of push-buttons of a push-button dialling keyboard 40. During the whole duration desired for the dialling interruption the transistor is non-conductive and the voltage at the input terminal 28 remains at a value higher than the threshold value $V_D$. At the moment at which the user wants to continue the redialling operation he presses any pushbutton of the keyboard 40, this operation having for its object to render the transistor 39 conductive. The voltage at the input terminal 28 is thus reduced to a value less than the threshold value $V_D$ and the redialling interruption is removed.

The invention is not limited to the sole embodiments shown in the FIGS. 1, 4 and 5 which employ a diode as a unidirectional conducting element and a transistor and pushbuttons of a keyboard as interrupt means. It is obvious that, without departing from the scope of the invention, a person skilled in the art can use any other unidirectional conducting element and any other known interruptor means.

What is claimed is:

1. A circuit for interrupting the redialling operation of an automatic redialling circuit for an interval of any optional duration, such redialling circuit being adapted to automatically redial at finite intervals of a duration ($t_s$), such redialling circuit comprising: a first supply terminal (1) connected to a first direct potential ($V_P$) exceeding a predetermined threshold direct voltage ($V_D$); a second supply terminal (15) connected to a second direct potential ($V_N$) which is negative relative to the first potential ($V_P$); an output terminal (27) at which during said finite intervals ($t_s$) a direct interrupt voltage ($V_S$) is produced which exceeds said threshold voltage ($V_D$); and an input terminal (28) at which, when the direct voltage applied thereto exceeds said threshold voltage ($V_D$) the redialling operation of the redialling circuit is interrupted; the current-voltage characteristic of said redialling circuit at said input terminal (28) being such that the current increases continuously up to a level corresponding to said threshold voltage ($V_D$) as the voltage thereat increases from zero to said predetermined threshold voltage ($V_d$) and then drops substantially to zero for higher voltages;

such interrupting circuit comprising: a uni-directionally conducting element (32) connected in the conductive direction between said output terminal and said input terminal; and circuit means connected to said input terminal for maintaining the voltage thereat above said threshold voltage ($V_d$) when said interrupt voltage ($V_S$) is not produced at said output terminal.

2. A circuit as claimed in claim 1, characterized in that said circuit means for maintaining the voltage at the input terminal (28) above the threshold voltage ($V_d$) comprises a resistor (33) connected between said input terminal (28) and the first supply terminal (1) which limits the current at said input terminal to a level below that corresponding to said threshold voltage ($V_D$).

3. A circuit as claimed in claim 1, wherein the said circuit means for maintaining the voltage at the input terminal (28) above the threshold voltage ($V_D$) comprises a capacitor (37) connected between the said input terminal (28) and the second supply terminal (15).

4. The circuit as claimed in claim 1 wherein the said uni-directionallly conducting element (32) is a diode.

5. The circuit as claimed in claim 1 wherein interruptor means (38) is arranged between the input terminal (28) and the second supply terminal (15), said interruptor means (38) being in the open state during the whole duration desired for the redialling interruption and being adjusted manually to the closed state when a continuation of the redialling operation is desired.

6. The circuit as claimed in claim 5, wherein the said interrupt means (38) is constituted by a transistor (39) whose base is connected to at least one push-button (16, 17, 18) of a push-button dialling keyboard (40).

* * * * *